United States Patent [19]

Jackson

[11] 3,856,954
[45] Dec. 24, 1974

[54] TOPICAL STEROID COMPOSITIONS

[75] Inventor: Ivan Jackson, St. John Forbes, Wirral, England

[73] Assignee: E. R. Squibb & Sons, Inc., Princeton, N.J.

[22] Filed: Nov. 8, 1972

[21] Appl. No.: 304,690

[30] Foreign Application Priority Data
Jan. 10, 1972  Great Britain ...................... 1080/72

[52] U.S. Cl. ............................................... 424/241
[51] Int. Cl............................................ A61k 17/06
[58] Field of Search .................................... 424/241

[56] References Cited
UNITED STATES PATENTS
3,312,591  4/1967  Elks et al. ........................... 424/241
3,352,753  11/1967  Lerner ................................ 424/241

OTHER PUBLICATIONS
Wolff et al., Soap & Chem. Specialities, pages 89, 91, 93, 95 & 99 – April 1961.
Carver et al., Amer. Jour. of Pharm., Vol. 129, pages 118–121, April 1957.
Merck Index 8th Ed., page 267, 1968.
Remington – Practice of Pharmacy, 12 Ed., pages 246, 418 and 1291 (1961).

*Primary Examiner*—Henry A. French
*Attorney, Agent, or Firm*—Lawrence S. Levinson; Merle J. Smith

[57] ABSTRACT

A stable composition for topical steroids comprises a gel formed from propylene glycol, isopropyl alcohol or ethyl alcohol and a carboxymethylene hydrocolloid polymer, and optionally containing alkali metal metabisulfite and/or citric acid.

7 Claims, No Drawings

TOPICAL STEROID COMPOSITIONS

BACKGROUND OF THE INVENTION

Steroids such as those described in U.S. Pat. No. 3,048,581 are frequently applied topically to the skin for their glucocorticoid and anti-inflammatory effect. The vehicle in which these medicaments are applied must be acceptable from numerous viewpoints. It must carry out its primary function of bringing the active substance to the site where it is needed and release that substance for absorption. It must be cosmetically acceptable, i.e., easy to apply, no unsightly or deleterious to whatever it comes into contact with such as clothing or undergarments. In addition it must be stable both in not itself affecting the active ingredient as well as protecting the active ingredient under conditions of packaging, sale, storage and use.

It has been found that a stable composition comprising a topical steroid in a gel formed from propylene glycol, isopropyl alcohol or ethyl alcohol and a carboxymethylene hydrocolloid polymer meets these requirements. This composition is further improved with the addition of a small amount of alkali metal metabisulfite and/or citric acid.

SUMMARY OF THE INVENTION

This invention comprises a topical steroid of the $\Delta^4$-pregnene series characterized by a 16,17-acetal or ketal group of the type described in U.S. Pat. No. 3,048,581, issued Aug. 7, 1962, in a vehicle which is a gel made from about 10 to 20%, preferably 12 to 20% (by wt.) of propylene glycol, about 3 to 20%, preferably 5 to 20%, (by wt.) of isopropyl alcohol or ethyl alcohol and about 0.5 to 2%, preferably 1 to 1.5% (by wt.) of carboxymethylene hydrocolloid polymer in aqueous medium. The gel may also contain about 0.01 to 0.15% (by wt.) citric acid, preferably about 0.1 % and/or about 0.01 to 0.15%, preferably about 0.1%, (by wt.) of alkali metal metabisulfite. The most preferred modification contains alkali metal metabisulfite.

DETAILED DESCRIPTION OF THE INVENTION

The topical steroids which are used in compositions of this invention are acetals and ketals of 16,17-dihydroxy steroids of the $\Delta^4$-pregnene series having the general formula as described in the aforementioned U.S. Patent:

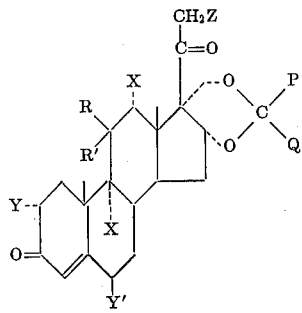

as well as the 1,2-dehydro and 6,7-dehydro derivatives thereof, wherein R is hydrogen, R' is β-hydroxy, and together R and R' is keto; X is selected from the group consisting of hydrogen, halogen, and lower alkyl, at least one X being hydrogen; Y and Y' are each selected from the group consisting of hydrogen and methyl; Z is selected from the group consisting of hydrogen, halogen, hydroxy and acyloxy; P is selected from the group consisting of hydrogen, lower alkyl, halo-lower alkyl, carboxy-lower alkyl, monocyclic cycloalkyl, monocyclic aryl, monocyclic aryl-lower alkyl, monocyclic heterocyclic and monocyclic heterocyclic-lower alkyl; Q is selected from the group consisting of lower alkyl, halo-lower alkyl, carboxy-lower alkyl, monocyclic cycloalkyl, monocyclic aryl, monocyclic aryl-lower alkyl, monocyclic heterocyclic and monocyclic heterocyclic-lower alkyl; and together with the carbon atom to which they are joined P and Q is selected from the group consisting of cycloalkyl and monocyclic heterocyclic.

Illustrative topical steroids of this group include, for example, triamcinolone acetonide, amcinafide, amcinafal and the like. Compositions containing triamcinolone acetonide constitute the particular embodiment to which this is especially directed.

An effective amount in the range of about 1 to 0.01%, preferably about 0.1 to 0.01%, (by wt.) of the topical steroid is included in the composition depending upon the potency of the particular steroid, the indication and the result desired. For example, in the case of the particularly preferred topical steroid triamcinolone acetonide, about 0.1 to 0.01%, preferably about 0.1 to 0.025% (by wt.) is used.

The carboxypolymethylene hydrocolloid polymer is described in U.S. Pat. No. 2,909,462, issued Oct. 10, 1959, being a pollymer of acrylic acid cross linked with polyallyl sucrose [marketed under the trade name Carbopol with various designations like 934, 940, 941 (B. F. Goodrich Chemical Co.)] About 0.5 to 2%, preferably about 1.0 to 1.5% (by wt.) is incorporated in the composition.

The propylene glycol is used in a proportion of about 10 to 20%, preferably 12 to 20% (by wt.). The isopropyl alcohol or ethyl alcohol are used in about the same proportion, although usually less ethyl alcohol is required. Preferably equal amounts (by wt.) of the propylene glycol and isopropyl alcohol are used.

Since there is sometimes some interaction of the ingredients or deleterious factors introduced during processing, packaging or storing of the compositions, it is desirable to include in the compositions a small, but effective amount of alkali metal metabisulfite, like sodium metabisulfite or potassium metabisulfite, especially the former, and/or citric acid. Each of these materials may be included in the composition in an amount within the range of about 0.01 to 0.15%, preferably about 0.1% (by wt.). The preferred compositions contain only sodium metabisulfite. Antibacterial agents and preservatives may be included in small amounts as optional ingredients according to conventional procedures.

The compositions of this invention are prepared by dissolving the topical steroid in the isopropyl alcohol or ethyl alcohol, then the propylene glycol is added to this solution.

The carboxymethylene hydrocolloid polymer is dispersed in water and stirred continuously until the polymer is completely hydrated.

The sodium metabisulfite and/or citric acid are dissolved in a small amount of water and added to the aqueous polymer dispersion. It is important that these substances be added to the aqueous phase.

The organic and aqueous phases are combined and then the gel is formed. The carboxymethylene hydrocolloid polymer is an acid and has to be neutralized to produce a clear gel. This can be carried out by the addition of a strong (1:1) aqueous solution of ammonia, strong alkalis, such as sodium hydroxide or amines such as ethanolamine. Ammonia is preferred. The pH is adjusted within the range of about 5 to 6.5.

All of these operations may be carried out at about ambient temperature.

The following examples are illustrative of the invention.

EXAMPLE 1

960 g. of Carbopol 934 [Merck Index, 8th ed. 1968, p.210] are dispersed in 45 liters of water and the mixture is stirred continuously until the Carbopol is completely hydrated. 80 g. of triamcinolone acetonide are dissolved in 16 kg. of isopropanol; 16 kg. of propylene glycol are then added and mixed. The solution of triamcinolone acetonide is added to the Carbopol dispersion and mixed under vacuum until homogeneous. 80 g. of sodium metabisulfite are dissolved in 1 liter of water and added to the Carbopol dispersion. The dispersion is gelled by admixing a mixture of equal parts of ammonia and water until the pH has been adjusted to 5.3. Water is added to make the batch up to 80 kg.

EXAMPLE 2

The procedure of Example 1 is followed except that 8 g. (instead of 80 g.) of triamcinolone acetonide are used and Carbopol 940 is substituted for Carbopol 934.

EXAMPLE 3

The procedure of Example 1 is followed except that 80 g. of citric acid are added along with the sodium metabisulfite.

EXAMPLE 4

The procedure of Example 1 is followed except that amcinafide is substituted for the triamcinolone acetonide.

What is claimed is:

1. A gel composition comprising, by weight, about 0.01 to 1% of a topical steroid selected from the group having the formula

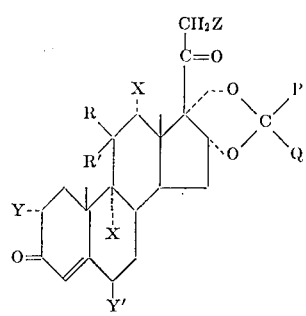

and the 1,2-dehydro and 6,7-dehydro derivatives thereof, wherein R is hydrogen, $R^1$ is $\beta$-hydroxy, and together R and $R^1$ is keto; X is hydrogen, halogen or lower alkyl, at least one X being hydrogen; Y and Y' each is hydrogen or methyl; Z is halogen, hydroxy or acyloxy; P is hydrogen, lower alkyl, halo-lower alkyl, carboxy-lower alkyl, monocyclic cycloalkyl, monocyclic aryl, monocyclic aryl-lower alkyl, monocyclic heterocyclic or monocyclic heterocyclic-lower alkyl; Q is lower alkyl, halo-lower alkyl, carboxy-lower alkyl, monocyclic cycloalkyl, monocyclic aryl, monocyclic aryl-lower alkyl, monocyclic heterocyclic or monocyclic heterocyclic-lower alkyl; and together with the carbon to which they are joined P and Q are cycloalkyl or monocyclic heterocyclic, about 0.5 to 2% of a carboxymethylene hydrocolloid polymer of acrylic acid cross linked with polyallyl sucrose, about 10 to 20% of propylene glycol, about 10 to 20% of isopropyl alcohol or ethyl alcohol and about 0.01 to 0.15% of alkali metal bisulfite.

2. A composition as in claim 1 comprising in addition about 0.01 to 0.15% of citric acid.

3. A composition as in claim 1 wherein the steroid is triamcinolone acetonide.

4. A composition as in claim 3 wherein the steroid comprises 0.01 to 0.1%, the polymer comprises about 1.2%, propylene glycol and isopropyl alcohol each comprises about 20% and the alkali metal metabisulfite is sodium metabisulfite comprising about 0.1%.

5. A composition as in claim 3 comprising in addition 0.1% citric acid.

6. A composition as in claim 1 wherein the steroid is selected from the group consisting of triamcinolone acetonide, amcinafide, or amcinafal.

7. A composition as in claim 1 wherein the steroid is amcinafide.

* * * * *